(12) United States Patent
Hermsdorf et al.

(10) Patent No.: US 8,813,506 B2
(45) Date of Patent: Aug. 26, 2014

(54) METHOD FOR QUICKLY CONNECTING A STEAM GENERATOR

(75) Inventors: Christian Hermsdorf, Langensendelbach (DE); Matthias Migl, München (DE); Georg Peters, Ottweiler (DE); Erich Schmid, Nürnberg (DE); Michael Schöttler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/701,893

(22) PCT Filed: Mar. 7, 2012

(86) PCT No.: PCT/EP2012/053852
§ 371 (c)(1),
(2), (4) Date: Dec. 4, 2012

(87) PCT Pub. No.: WO2012/126727
PCT Pub. Date: Sep. 27, 2012

(65) Prior Publication Data
US 2014/0000259 A1    Jan. 2, 2014

(30) Foreign Application Priority Data
Mar. 24, 2011  (EP) .................................. 11159511

(51) Int. Cl.
*F02C 6/00* (2006.01)
*F02C 7/26* (2006.01)
*F01K 13/00* (2006.01)

(52) U.S. Cl.
USPC .............. 60/778; 60/787; 60/39.182; 60/646; 60/657; 60/660; 60/676

(58) Field of Classification Search
USPC .............. 60/39.182, 778, 787, 646, 657, 676, 60/660, 664
See application file for complete search history.

(56) References Cited

U.S. PATENT DOCUMENTS

| 2,384,587 A | * | 9/1945 | Badenhausen | .................. 60/657 |
| 3,919,839 A | * | 11/1975 | Aguet | ........................ 60/39.182 |
| 5,109,665 A | * | 5/1992 | Hoizumi et al. | ........... 60/39.182 |
| 5,379,588 A | * | 1/1995 | Tomlinson et al. | ........ 60/39.182 |

(Continued)

FOREIGN PATENT DOCUMENTS

| AU | 485120 B2 | 3/1976 |
| DE | 2730415 A1 | 1/1979 |

(Continued)

*Primary Examiner* — Hoang Nguyen

(57) ABSTRACT

A method is provided for connecting at least one further steam generator to a first steam generator in a power plant. The power plant includes at least two steam generators and a steam turbine, in which a fluid used to drive the steam turbine is conveyed in a fluid circuit having a plurality of steam systems. The steam systems are assigned individual steam generators and are able to be separated from one another by shut-off valves. The fluid of at least the first steam generator is connected to the steam turbine. The method involves opening the shut-off valve of at least one first steam system of the at least one further steam generator before the steam of the at least one further steam generator has reached approximately the same steam parameters as the steam of the first steam generator, so that steam can flow into the further steam generator.

14 Claims, 2 Drawing Sheets

(56) References Cited

U.S. PATENT DOCUMENTS

| | | | |
|---|---|---|---|
| 5,727,379 A * | 3/1998 | Cohn | 60/39.182 |
| 5,822,974 A * | 10/1998 | McGowin et al. | 60/39.182 |
| 2005/0034445 A1 | 2/2005 | Radovich | |
| 2010/0229523 A1 | 9/2010 | Holt | |
| 2010/0263376 A1 | 10/2010 | Smith | |

FOREIGN PATENT DOCUMENTS

| | | |
|---|---|---|
| KR | 1020010072502 | 7/2001 |
| KR | 1020010040271 | 3/2006 |
| WO | WO 2009131438 A2 | 10/2009 |

\* cited by examiner

METHOD FOR QUICKLY CONNECTING A STEAM GENERATOR

CROSS REFERENCE TO RELATED APPLICATIONS

This application is the US National Stage of International Application No. PCT/EP2012/053852, filed Mar. 7, 2012 and claims the benefit thereof. The International Application claims the benefits of European application No. 11159511.2 EP filed Mar. 24, 2011. All of the applications are incorporated by reference herein in their entirety.

FIELD OF INVENTION

The invention relates to a method for rapid connection of at least one further steam generator to a first steam generator in a power plant. The invention further relates to the use of the method in a combined-cycle power plant and in a steam power plant.

BACKGROUND OF INVENTION

In a power station in which two or more steam generators are connected to a steam turbine, for running turbines alongside one another or connection of a second or third steam generator the steam systems must be brought to approximately the same the steam states (pressure, temperature) to enable the systems to be connected by opening the shut-off valves.

A specific time is needed for this and mostly the steam generator power must also be kept constant in such cases so that the most stationary and stable possible states are present during the coupling. If this is not the case variations in pressure, temperature and/or quantity of steam can result in problems within the steam generator systems (drum level changes) or the operation of the steam turbine (limit values being reached, steam turbine trip). This means that a specific time is needed for this synchronization and the power plant output cannot be increased as quickly as desired. In addition the steam generated during the connection process is discarded via the bypass station into the condenser and the efficiency of the plant reduced thereby.

A method is known in which the steam systems are brought up to approximately the same pressure and temperature in accordance with a specific logical sequence and the system is coupled in a specific sequence. For example with three-pressure systems with simple intermediate superheating, first of all the cold intermediate superheating system is set to the same steam parameters and coupled by opening the cold intermediate superheating slider to the intermediate superheating system in operation with the steam turbine. Then the high-pressure steam system of the second steam generator is connected in the same way with the first steam generator in operation. Subsequently, when the pressure and temperature are equal, the hot intermediate superheating system is also coupled by the steam slider in the hot intermediate superheating system being opened. The bypass stations in such cases are each closed in a controlled manner and thereby a greater load is imposed on the steam turbine. In the same way after these steps the low-pressure steam system is also connected to the second steam generator, the disadvantage of this method is that it is very time-consuming.

As an alternative to this, after the harmonization of the different pressure and temperature levels, the shut-off valves of the different pressure systems can be opened at more or less the same time and the second steam generator is thus coupled to the first steam generator already in operation with the steam turbine. In this case to the steam generator power (thus also the power of the gas turbine for combined cycle plants) must be kept constant, i.e. a further starting up of the steam generator is stopped. This method, although faster, conceals the additional risk however of problems developing in a number of systems of the same time and possibly influencing each other. This method makes an unwanted shutdown of the steam turbine or of the steam generator significantly more likely because limit values have been exceeded (drum level high or low, too little or too much steam in the steam turbine direction).

SUMMARY OF INVENTION

The object of the invention is thus to further develop the method for connecting a further steam generator, so that a significant shortening of the connection process is achieved. The previous delays in the connection of a second or third steam generator by stopping the steam generator output or by the coupling of the steam generator systems themselves are to be kept as small as possible or done away with completely.

In accordance with the invention this object is achieved by the features of the independent claim(s). Advantageous developments of the invention are defined in the dependent claims. In that on connection of at least one further steam generator to a first steam generator in a power plant, which comprises at least two steam generators and a steam turbine, in which a fluid used for driving the steam turbine is conveyed in a fluid circuit comprising a number of steam systems, wherein the steam systems are assigned to individual steam generators and are able to be separated from one another with shut-off valves and in which the fluid of the at least one first steam generator is connected to the steam turbine, before the steam of the at least one further steam generator has reached approximately equal steam parameters to the steam of the first steam generator, the shut-off valve of at least one first steam system of the at least one further steam generator is open so that steam can flow into the further steam generator, enables the coupling of the steam systems to be already carried out during the start-up of the second steam generator without stopping the increase in load. This means that no time is lost for the coupling and the bypass stations can be closed as quickly as possible.

Advantageously the shut-off valve of the at least one first steam system is opened in a cold intermediate superheating line. The part-opening of the valve in the cold intermediate superheating line leads to steam flowing out of the system which is in operation, comprising the steam turbine and the first steam generator, into the intermediate superheating system of the further steam generator and filling this practically to the same pressure.

Expediently temperature and pressure of the fluid in the at least one second steam system of the at least one further steam generator are further increased and the steam from the second steam system is diverted into the first steam system of the further steam generator, so that steam from the further steam generator flows via the opened shut-off valve into the first steam generator. It is ensured through the partly open cold intermediate superheating shut-off valve that steam from the high-pressure steam system of the further steam generator which, during start-up of this further steam generator, does not yet exhibit the parameters to enable it to be switched to the high-pressure part of the steam turbine and thus flows via the high-pressure bypass station into the cold intermediate superheating line and possibly cannot be taken away from the medium pressure bypass station, is conducted by backflow into the cold intermediate superheating system of the first steam generator which is in operation and flows via its intermediate superheating unit to the steam turbine and thus already leads to an increase in steam turbine output.

Advantageously, at least in one of the other steam systems of the further steam generator its shut-off valve is opened, especially in the high-pressure or fresh steam line and in the low-pressure line. This is possible since return valves are usually present in the high-pressure and low-pressure system, which prevent a backflow from the system in operation. The increase in output of the second steam generator (or of the gas turbine in combined cycle power plants) means that steam temperatures and pressure increase further. By a modified pressure regulation (e.g. conversion to throughflow-guided high-pressure bypass valve regulation) it is achieved that the approximation of the pressure to the first steam generator which is it operation occurs in a moderate manner. When the pressure is equalized the return valves of the high-pressure and low-pressure steam system of the further steam generator open and the steam flow in the direction of the steam turbine is initiated. If no return valves are present in these steam lines, the same effect can be achieved by an opening of the respective shut-off valves at measured equal pressure.

So that the temperature measurements can detect the increase of the steam temperatures in the further steam generator or the injection coolers can work in an orderly manner, it is advantageous for a low flow to be generated in the intermediate superheating system of the further steam generator, e.g. by slight opening of a valve in a medium pressure line or a heating line which opens out into a hot intermediate superheating line.

Expediently bypass valves are closed after corresponding shut-off valves have been opened, so that the steam produced is accepted by the steam turbine and is no longer conveyed into the condenser.

Advantageously a shut-off valve is opened in a hot intermediate superheating line as soon as the steam temperature of the further steam generator is essentially equal to the steam temperature of the first steam generator. The cold intermediate superheating valve then regulates an amount of steam which roughly corresponds to the amount of high-pressure steam produced, in order to avoid a split load in the two steam generators as far as possible.

It is expedient for the shut-off valve in the cold intermediate superheating unit to be opened again accordingly when the throughflow in the high-pressure steam system of the further steam generator increases.

In a combined-cycle power plant it can also be expedient for the shut-off valve to be opened during synchronization of a gas turbine assigned to one of the further steam generators.

Advantageously the method is used in a combined cycle power plant or in a multi-block steam power plant.

Inventively the connection is not undertaken as previously in the most stationary possible steam states but during a continually rising pressure and variable outputs and amounts of steam.

The intermediate superheating system of the further steam generator is brought up to pressure by the already running intermediate superheating system of the first steam generator and a small amount of steam flows through it although the high-pressure steam production of the further steam generator might not yet have begun at all. When this process then begins, the mode of operation of high-pressure steam system and intermediate superheating system is able to be performed relatively independently by the explicitly allowed flowback into the cold intermediate superheating line. This reduces the complexity of the regulation and a step-by-step connection of the steam systems one after the other is not absolutely necessary and is thus decoupled over time.

This produces significant advantages on start-up of 2×1 or more×1 system configurations or in connecting the second or third steam generator (or gas turbine waste heat steam generator unit in combined-cycle power plants) such as generally for example a shorter connection time for the second or third steam generator, which increases the cost effectiveness and the average level of efficiency of the plant. Furthermore the start-up time of a power plant is naturally also shortened if the steam generators can be started up offset for various reasons. Especially with frequent starts (so-called medium load systems or peak-load systems) this leads to a higher average level of system efficiency over the operating time and thus also to lower emissions (environmentally friendly). Thus these plants become more cost-effective and also required more often by the load distributor for grid operation.

BRIEF DESCRIPTION OF THE DRAWINGS

The invention will be explained in greater detail on the basis of the drawings, in which, in schematic diagrams which are not true to scale.

DETAILED DESCRIPTION OF INVENTION

Figure 1:
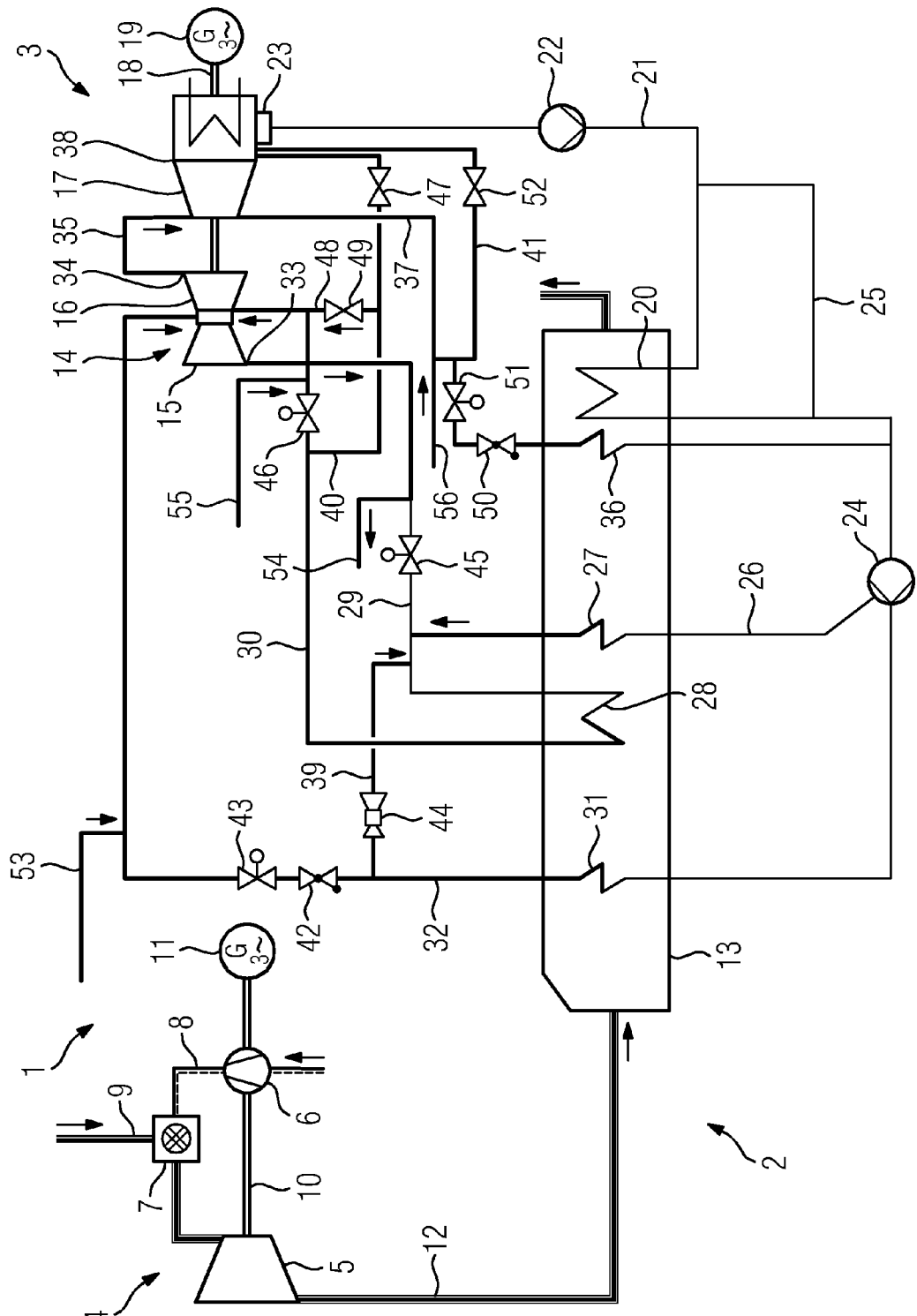
FIG. 1 shows a simplified water-steam circuit of a 2×1 combined cycle power plant.

FIG. 1 shows a schematic diagram by way of an example of a combined cycle power plant 1 having two gas turbine/waste heat steam generator units 2 and a steam turbine system 3, wherein the two gas turbine/waste heat steam generator units can principally be the same. Only the connections from and to the steam turbine system 3 from the first gas turbine/waste heat steam generator unit 2 are shown. As an alternative to the combined-cycle power plant 1 shown, the inventive method is also applicable to a multi-block steam power plant in which the gas turbine/waste heat steam generator units would be replaced by fired steam generator units.

The gas turbine plant 4 is equipped with a gas turbine 5, a compressor 6 as well as at least one combustion chamber 7 connected between the compressor 6 and the gas turbine 5. Fresh air is sucked, compressed and supplied via the fresh air line to one or more burners of the combustion chamber 7 by means of the compressor 6. The supplied air is mixed with a liquid or gaseous fuel supplied via a fuel line 9 and the mixture is ignited. The combustion waste gases arising in this process form the working medium of the gas turbine plant 4, which is supplied to the gas turbine, where it expands and performs work and drives a shaft 10 coupled to the gas turbine 5. As well as being coupled to the gas turbine 5, the shaft 10 is also coupled to the air compressor 6 as well as a generator 11, in order to drive these units. The expanded working medium is taken away via an exhaust gas line 12 to a waste heat steam generator 13, which can especially be embodied as a once-through system, and leaves the waste heat steam generator 13 on the output side in the direction of a chimney not shown in the figure.

The steam turbine 14 of the steam turbine plant 3 has a first pressure stage 15 or a high-pressure part and a second pressure stage 16 or a medium-pressure part as well as a third pressure stage 17 or a low-pressure stage which drive the generator 19 via a joint shaft 18.

The waste heat steam generator 13 comprises a condensate preheater 20 as a heating surface, which is supplied on the input side via a condensate line 21, into which a condensate pump 21 is connected, with condensate from the condenser 23. The condensate preheater 20 is routed on the suction side to a feed water pump 24. For any required bypassing of the condensate preheater 20, this unit is bridged by a bypass line 25.

The feed water pump 24 is embodied in the exemplary embodiment as a high-pressure feed pump with a mid-pressure take-off 26. It brings the condensate to a pressure level suitable for a high-pressure stage of the flow-medium circuit assigned to the high-pressure part 15 of the steam turbine 14. The condensate routed via the feed water pump 24 is supplied at medium pressure to a mid-pressure steam system 27, comprising a feed water preheater, a mid-pressure evaporator and a superheater, which is connected on its output side to a cold intermediate superheater line 29 linked on its output side to an intermediate superheater 28. The intermediate superheater 28 in its turn is connected on its output side via a steam line 30 to the medium-pressure part 16 of the steam turbine 14.

On the high-pressure side the feed water pump 24 is linked to a high-pressure steam system 31, comprising a high-pressure economizer, a high-pressure condenser and a high-pressure superheater, which is linked on the output side to the high-pressure part 15 of the steam turbine 14 via a fresh steam line 32.

In the high-pressure side of the steam turbine the steam superheated by the superheater 28 drives the turbine 14, before it is forwarded via the steam outlet 33 of the high-pressure part 15 of the steam turbine 14 and the cold intermediate superheating line 29 to an intermediate superheater 28.

After being superheated in the superheater 28, the steam is conveyed onwards via the steam line 30 to the medium-pressure part 16 of the steam turbine 14, where it drives the turbine.

The steam outlet 34 of the medium-pressure part 16 of the steam turbine 14 is linked via an overflow line 35 to the low-pressure part 17 of the steam turbine 14.

Also linked to the low-pressure part 17 of the steam turbine 14 is a low-pressure steam system 36 fed from the condensate line 21, comprising a low-pressure steam generator disposed in the waste heat steam generator 13 and a low-pressure superheater which supplies steam to the low-pressure part 17 of the steam turbine 14 via the low-pressure steam line 37.

After it has flowed through the low-pressure part 17 and has accordingly driven the turbine 14, the cooled and expanded steam is output via the steam outlet 38 of the low-pressure part 17 of the steam turbine 14 to the condenser 23.

As well as the elements of the water-steam circuit already described, this circuit also includes a bypass line, the so-called high-pressure bypass 39, which branches off from the fresh steam line 32 before this reaches the high-pressure part 15 of the steam turbine 14. The high-pressure bypass 39 bypasses the high-pressure part 15 and opens out into the cold intermediate superheater line 29 between high-pressure part 15 and intermediate superheater 28.

A further bypass line, the so-called medium pressure bypass, 40 branches off from the steam line 30 before this opens out into the medium pressure part 16 of the steam turbine 14. The medium pressure bypass 40 bypasses both the medium-pressure part 16 and also the low-pressure part 17 of the steam turbine and opens out into the condenser 23.

The low-pressure steam system 36 also has a low-pressure bypass 41 which bypasses the low-pressure part 17 of the steam turbine 14 and supplies steam directly to the condenser 23.

Built into the fresh steam line 32 are shut-off valves, such as a return valve 42 and a slider 43 for example, with which it can be blocked. Located in the high-pressure bypass 39 is a further shut-off valve 44. There is also a shut-off valve 45 in the cold intermediate superheating line 29, as well as a further shut-off valve 46 in the hot intermediate superheating line 30.

A valve 47 is also disposed in the medium-pressure bypass 40.

A heating line 48 linking the medium pressure bypass 40 with the hot intermediate superheater line 30 likewise features a valve 49.

There are also two shut-off valves built into the low-pressure steam line 37, and these are a return valve 50 and a slider 51, with which this line can be blocked. Likewise a shut-off valve 52 is located in the low-pressure bypass 41 to the condenser 23.

The bypass lines 39, 40, 41 and the shut-off valves 42, 43, 44, 46, 47, 49, 50, 51, 52 are used during the start-up of the combined cycle power plant 1 to divert a part of the steam to bypass the steam turbine 14.

The connections 53-56 to the first steam generator unit are in the fresh steam line 32, the cold intermediate superheater line 29, the hot intermediate superheater line 30 and in the low-pressure steam line 37.

An exemplary embodiment is described below for the inventive method for connecting a further steam generator based on FIG. 1.

At the beginning of the method in accordance with the invention, the steam turbine plant 3 is already being supplied with steam by a first steam generator or a first gas turbine waste heat steam generator respectively. To connect a further gas turbine waste heat steam generator unit 2, the gas turbine system 4 is started and the working medium emerging from it is supplied to the waste heat steam generator 13. The expanded working medium flows through the waste heat steam generator 13 and leaves this unit via an outlet in the direction of the chimney not shown in FIG. 1. As it flows through the waste heat steam generator 13, heat is transferred from the working medium to the water or to the steam respectively in the water-steam circuit.

After the gas turbine system 4 is started up, the waste heat of the working medium leads in the waste heat steam generator 13 to the beginning of steam production in the steam system.

To couple the steam systems during the start-up of the second steam generator 13 without stopping the increase in load, the sliders 43, 45 and 51 in the high-pressure steam system 31, in the cold intermediate superheater line 29 of the medium pressure steam system 27 and in the low-pressure steam system 36 are already opened relatively early, e.g. during synchronization of the further gas turbine system 4 or during the increase in pressure of the further waste heat steam generator 13. This is possible since the usual return valve 42 and 50 are present in the high-pressure system 31 and in the low-pressure system 36, which prevent any flowback from the system in operation.

The part-opening of the shut-off valve 45 in the cold intermediate superheating line 29 leads to steam from the system in operation flowing into the further intermediate superheater 28 and filling the latter practically to the same pressure. In addition by generation of a low flow in the further intermediate superheating system, e.g. by slight opening of the valve 47 in the medium-pressure bypass 40 or of the valve 49 in the warming line 48, it is ensured that temperature measurements detect the increase of the steam temperatures or injection coolers can operate correctly.

Furthermore it is ensured by the part-opened shut-off valve 45 in the cold intermediate superheating line 29 that the high-pressure steam which flows via the high-pressure line 39 into the cold intermediate superheating line 29 and can possibly not be taken away by the medium-pressure bypass 40, is conveyed by flowback into the cold intermediate superheating system of the first steam generator, and flows via its intermediate superheater to the steam turbine 14 and thus already leads to an increase in steam turbine power.

Through the power increase of the second steam generator 13 (or of the gas turbine system in combined-cycle power plants) steam temperatures and pressure continue to increase. Through a modified pressure regulation (e.g. conversion to throughflow-controlled high-pressure bypass valve regulation) it is achieved that the approximation of the pressure to the operating first steam generator steam system occurs in a moderate manner. At equal pressure the return of valves 42 and 50 of the high-pressure steam system 31 and of the low-pressure steam system 36 of the further steam generator 13 open and the flow of steam in the direction of the steam turbine 14 is initiated. If no return valves 42 or 50 are present in these steam lines 32 the same effect can be achieved by an opening of the respective shut-off valves when equal steam pressure is measured.

Through the increasing closure of the bypass valves 44, 47, 52 the steam generator steam produced is finally accepted by the steam turbine 14.

The shut-off valve 46 in the hot intermediate superheating line 30 is opened as soon as the steam temperature of the further steam generator 13 is approximately equal to the first steam generator which is in operation. The cold intermediate superheating valve 45 then regulates an amount of steam which approximately corresponds to the amount of high-pressure steam produced, in order to avoid as far as possible an unbalanced load in the two steam generators.

Figure 2:
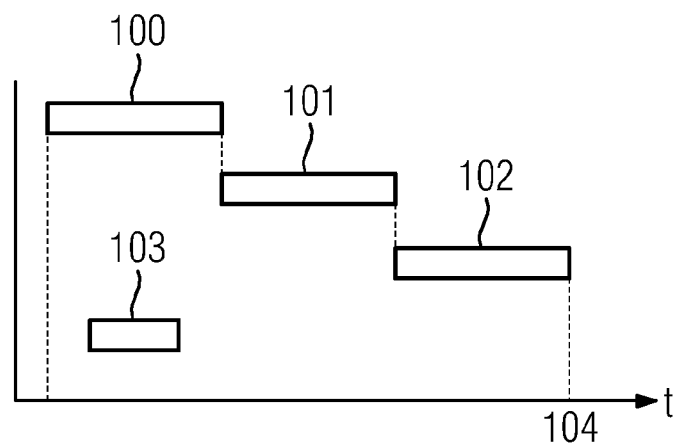
FIG. 2 shows a timing curve for the connection of a steam generator in accordance with the prior art and FIG. 3 shows a timing curve for the connection of the steam generator in accordance with the invention.

FIG. 2 shows a schematic diagram of the timing curve for the connection of a further steam generator 13 in accordance with the prior art. As already stated, according to the prior art, the steam systems are brought in accordance with a specific sequence up to approximately equal pressure and equal temperature and are coupled in a specific sequence. Usually the process begins with the cold intermediate superheater 100. Once this is fully connected, it is followed by the hot intermediate superheater 101 and, after its full connection, the high-pressure system 102. The low-pressure system can also be connected shortly after the beginning of the connection of the cold intermediate superheater. In this way around 15 to 20 minutes elapse before all bypass valves are closed.

Figure 3:
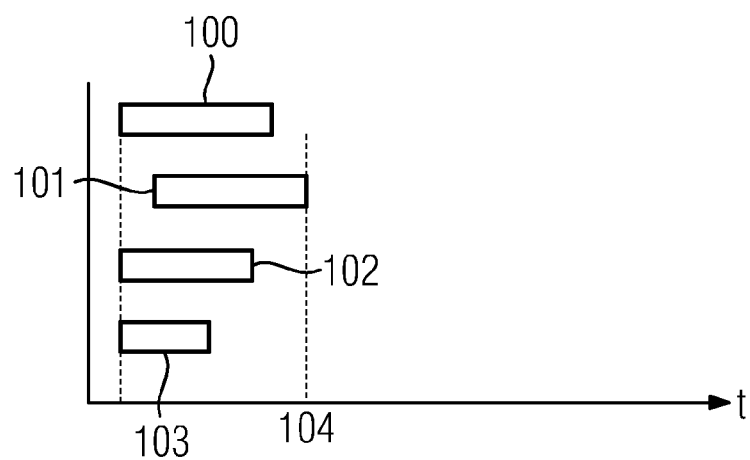

By contrast with this method, as shown in FIG. 3, in the inventive method the individual systems are connected at an early stage and for the most part almost simultaneously, so that there is practically no delay for the starting up of the gas turbine during addition of the second gas turbine/waste heat steam generator system. The closure of the bypass valves depends on how fast the steam turbine can accept the steam from the second waste heat steam generator.

The invention claimed is:

1. A method for connecting at least one further steam generator to a first steam generator in a power plant, the power plant comprising at least said two steam generators and a steam turbine, in which a fluid used to drive the steam turbine is conveyed in a fluid circuit comprising a plurality of steam systems, wherein the steam systems are assigned individual steam generators and are able to be separated from one another by shut-off valves and in which the fluid of at least the first steam generator is connected to the steam turbine, the method comprising:
opening the shut-off valve of at least one first steam system of the at least one further steam generator before the steam of the at least one further steam generator has reached approximately the same steam parameters as the steam of the first steam generator, so that steam can flow into the further steam generator.

2. The method as claimed in claim 1, comprising opening the shut-off valve of the at least one first steam system in a cold intermediate superheating line.

3. The method as claimed in claim 1, further comprising:
further increasing the temperature and pressure of the fluid in at least one second steam system of the at least one further steam generator, and
diverting the steam from the second steam system into the first steam system, so that steam from further steam generators flows via the opened shut-off valve into the first steam generator.

4. The method as claimed in claim 1, wherein, at least in one of the further steam systems of the further steam generator, its shut-off valve is opened.

5. The method as claimed in claim 4, wherein the shut-off valve of the further steam system of the further steam generator in a fresh steam line is opened.

6. The method as claimed in claim 4, wherein the shut-off valve of the further steam system of the further steam generator in a low-pressure line is opened.

7. The method as claimed in claim 1, further comprising opening a valve in a medium-pressure line in the further steam generator.

8. The method as claimed in claim 1, further comprising opening a valve in a warming line of the further steam generator opening out into a hot intermediate superheating line.

9. The method as claimed in claim 1, further comprising closing the bypass valves after corresponding shut-off valves have been opened.

10. The method as claimed in claim 1, further comprising opening a shut-off valve in a hot intermediate superheating line as soon as the steam temperature of the further steam generator is essentially equal to the steam temperature of the first steam generator.

11. The method as claimed in claim 1, wherein the shut-off valve is opened if the throughflow in the high-pressure steam system of the further steam generator increases.

12. The method as claimed in claim 1, wherein the shut-off valve is opened on synchronization of a gas turbine assigned to one of the further steam generators.

13. The method as claimed in claim 1, wherein said power plant is a combined cycle plant.

14. The method as claimed in claim 1, wherein said power plant is a multi-block steam power plant.

\* \* \* \* \*